United States Patent [19]

Bowley

[11] 4,383,182
[45] May 10, 1983

[54] UNDERWATER POWER GENERATOR

[76] Inventor: Wallace W. Bowley, Med. Engr. Dept., Box V-139, Storrs, Conn. 06268

[21] Appl. No.: 1,595

[22] Filed: Jan. 8, 1979

Related U.S. Application Data

[63] Continuation of Ser. No. 585,907, Jun. 11, 1975, abandoned.

[51] Int. Cl.³ ............................................. F03B 13/10
[52] U.S. Cl. ...................................... 290/43; 290/54; 417/334
[58] Field of Search .................. 290/4, 43, 44, 52, 54, 290/55; 60/398; 415/8; 417/3, 334–336

[56] References Cited

U.S. PATENT DOCUMENTS 1,074,292  9/1913  Reynolds ...................... 417/334 X
2,501,696  3/1950  Souczek ............................. 290/43

Primary Examiner—J. V. Truhe
Assistant Examiner—W. E. Duncanson, Jr.

[57] ABSTRACT

Apparatus and method for generating electrical power by disposing a plurality of power producing modules in a substantially constant velocity ocean current and mechanically coupling the output of the modules to drive a single electrical generator.

10 Claims, 7 Drawing Figures

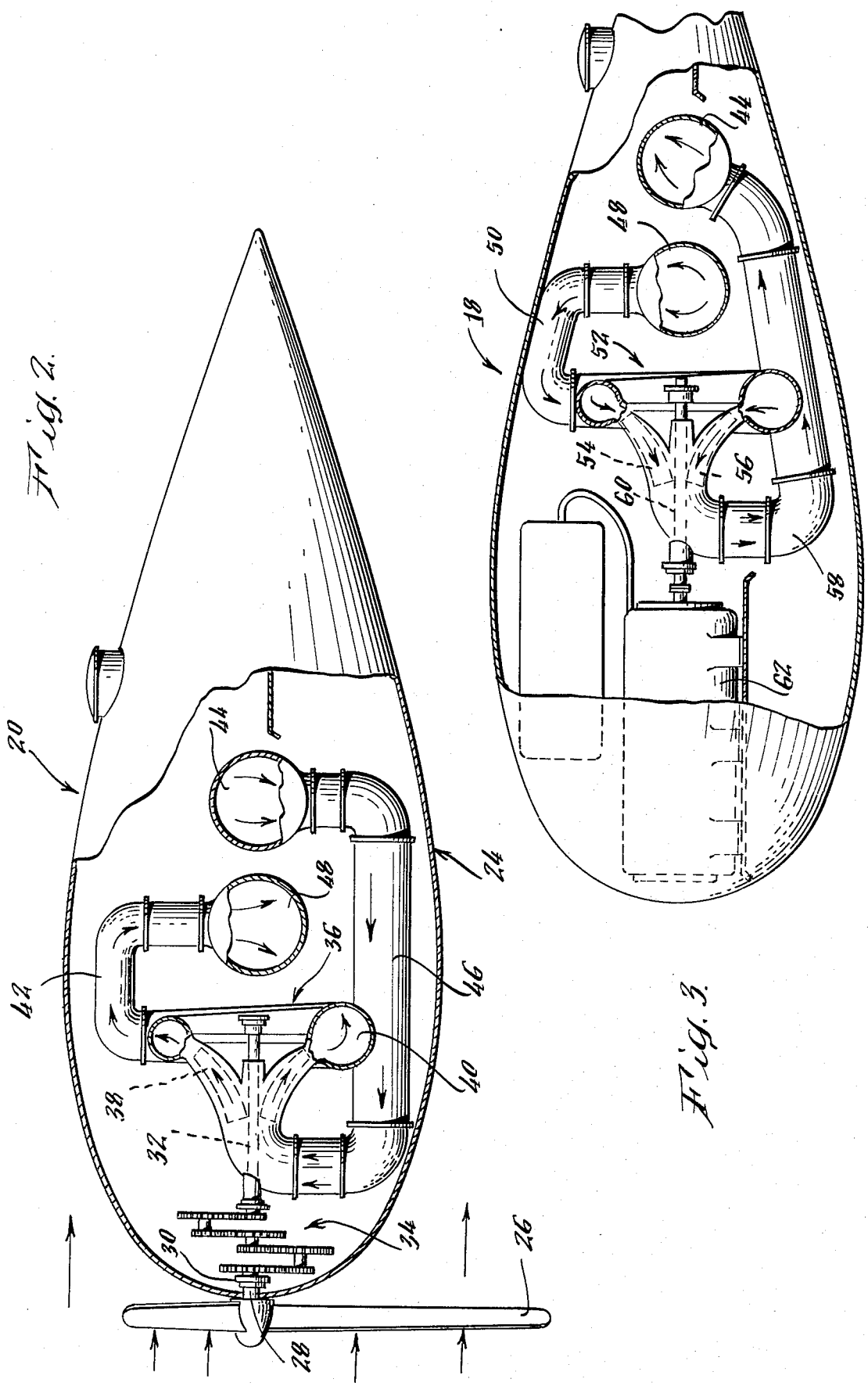

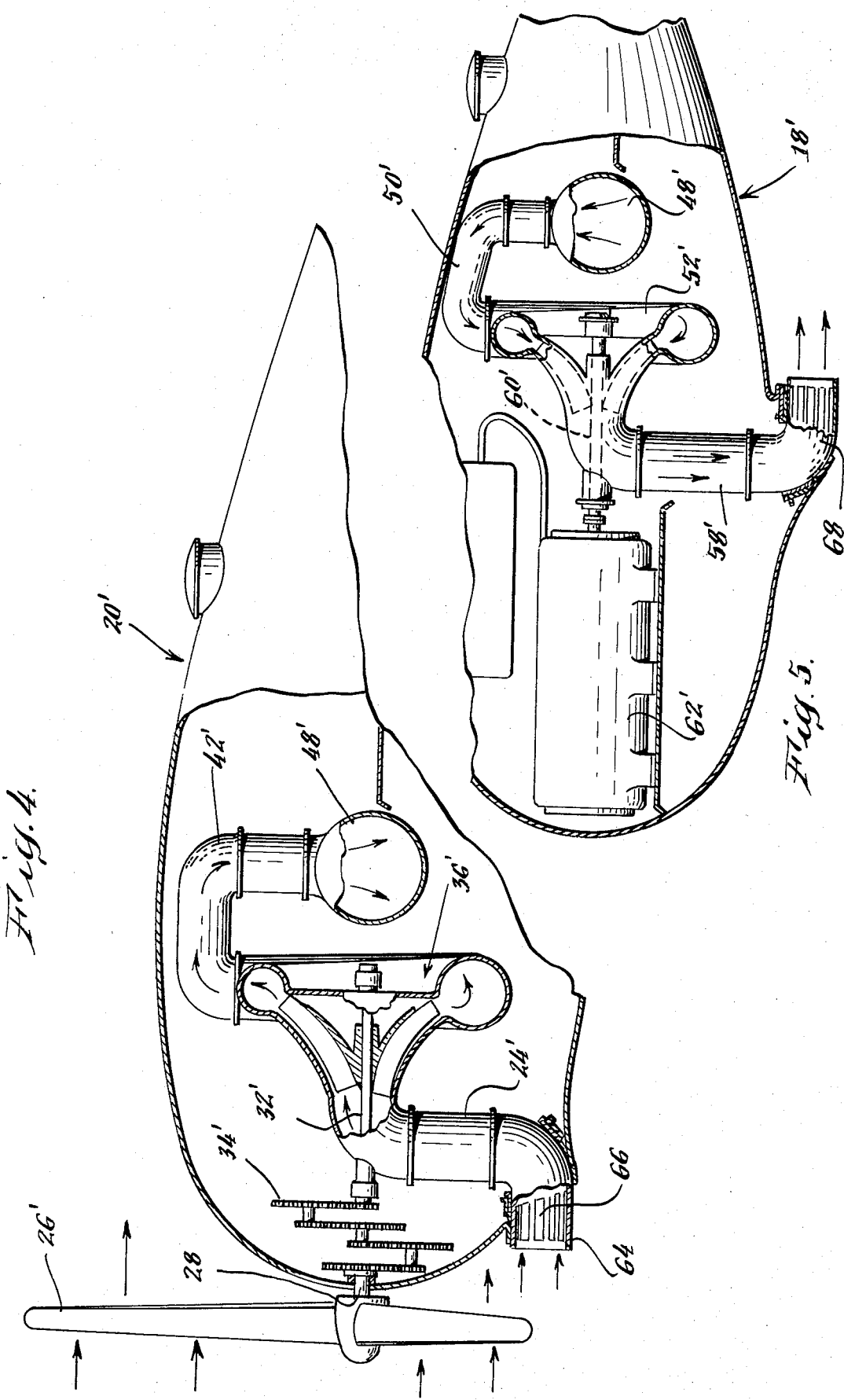

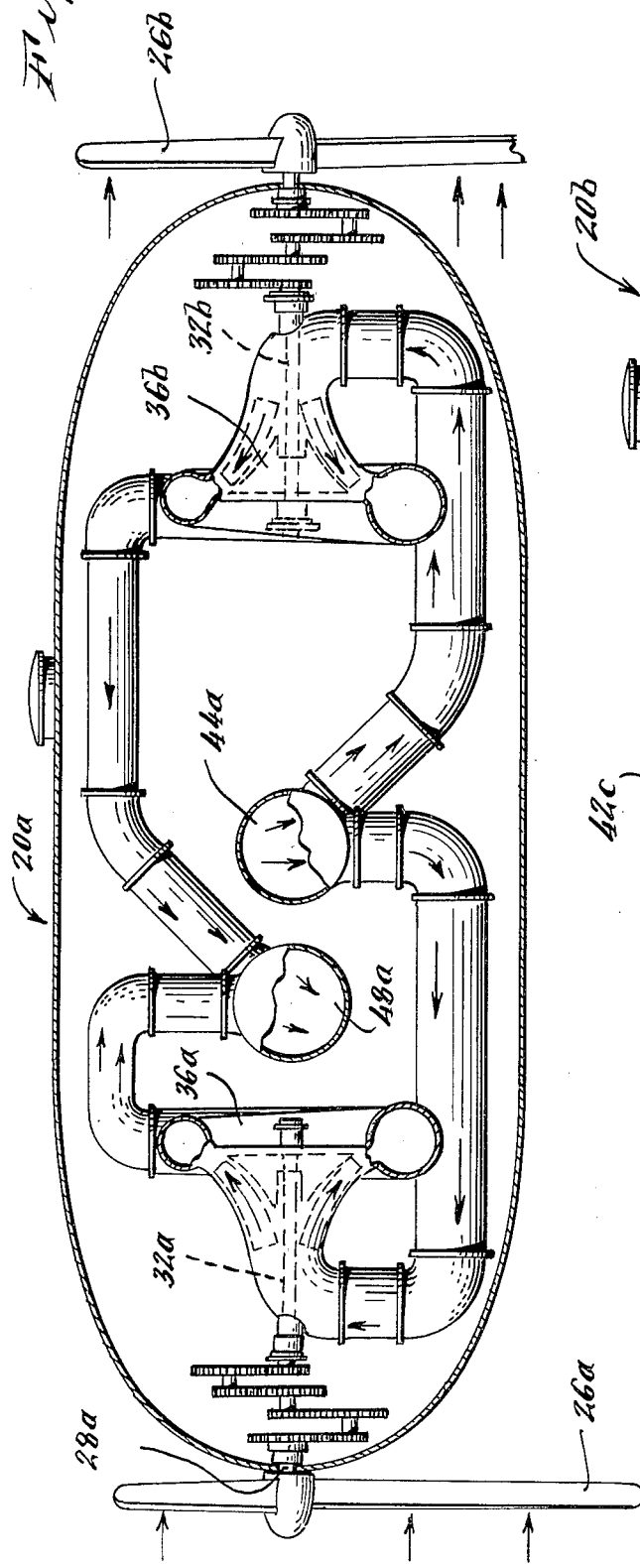
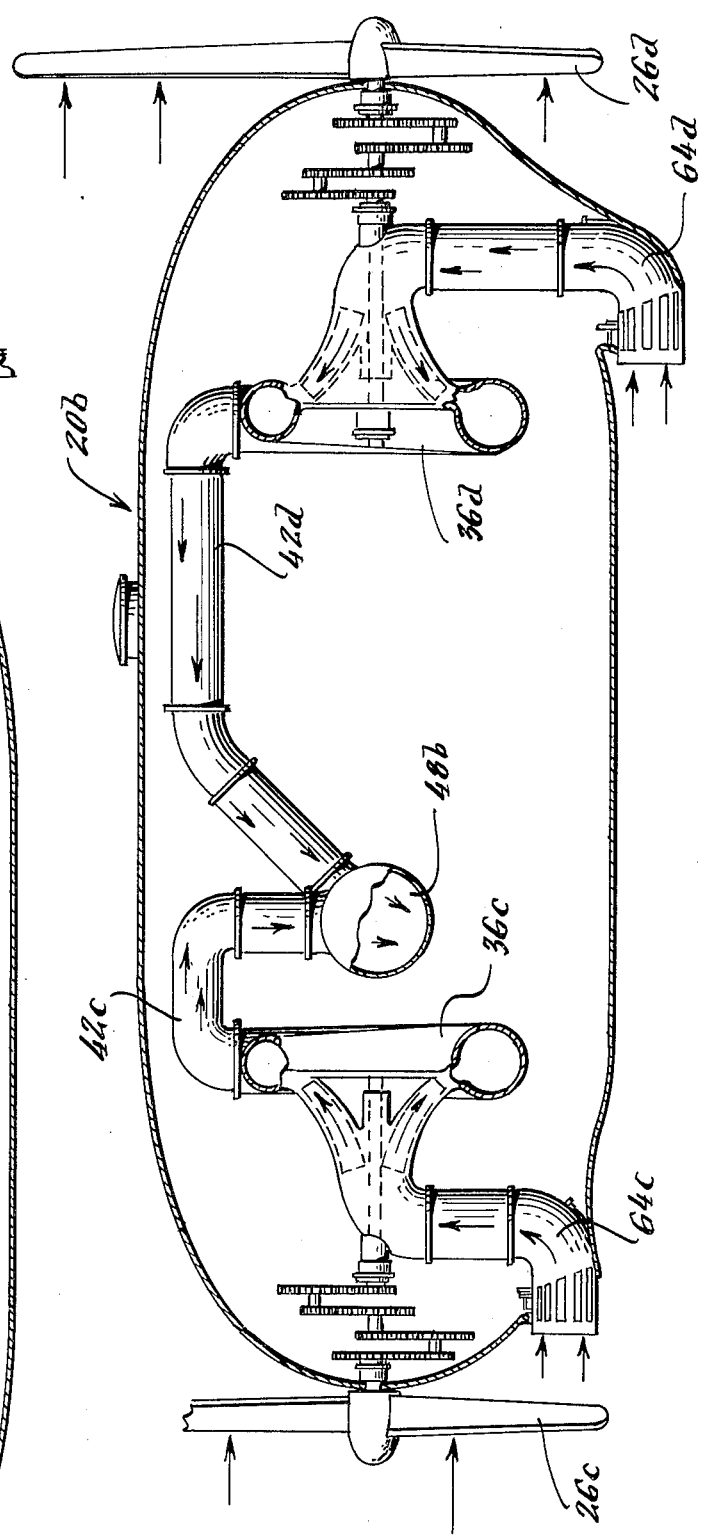

UNDERWATER POWER GENERATOR

This is a continuation of application Ser. No. 585,907, filed June 11, 1975, now abandoned.

BACKGROUND OF THE INVENTION

1. Field of Invention:

This invention relates to an apparatus and method for generating electrical power, and more particularly, an apparatus and method for converting the energy contained in large ocean streams into usable electric power.

2. Description of the Prior Art:

Conventional power sources such as natural gas and oil are being rapidly depleted throughout the world. Alternative sources such as natural fluid streams or currents are presently under investigation since such sources are readily available and inexhaustible.

Accordingly, the prior art is replete with devices and methods for converting the energy contained in natural fluid streams, such as the wind and the tides, into usable electric power. Windmills commonly found on land is just one example of such an attempt to turn energy in a natural fluid stream into electric power, while turbines driven by the flow of trapped tidal waters are another. Prior attempts to convert such energy have usually failed for a number of reasons. The cost of the apparatus to convert the energy stored in a natural flowing stream has usually been prohibitive. Further, tidal and wind motion is unpredictible in nature and apparatus must be provided to store energy during peak periods of wave and wind activity for later use. The power generated from such devices is also unpredictable since electrical output fluctuates in accordance with fluctuation in wind and wave activity.

The apparatus and method of the present invention is based on an entirely different approach. An economical apparatus has been designed for installation in large ocean streams or currents, such as the Gulf Stream, to generate electrical power in large quantities. Ocean currents, as distinguished from wind and tide activity, are of a steady and predictible nature, and are in concentrated regions in close proximity to land, wherein the power can be taken directly to land by electrical cable. The velocity of such ocean streams and temperature gradings are well known and vary within precise limits, so that an apparatus can be designed with a steady and predictible output. No electrical storage facilities are needed because such current velocities are essentially constant, which results in reduced cost and increased efficiency of the equipment used for such purposes. Because the mass flow rate of water is the same for the upper and lower portions of the currents and the currents flow in a fixed direction and magnitude, there is no need for additional static support structure, but an apparatus can be designed based on hydrodynamic buoyant and lift forces.

The use of ocean currents, as distinguished from wind and tidal currents, for the generation of electrical power has been attempted. However, such attempts have operated on an entirely different principle than direct conversion of mechanical energy to electric power. For example, the difference in the ocean thermal gradients of the current have been used to generate water vapor or the vapor of some intermediate working fluid such as Freon. This vapor is then expanded through turbines to drive generators, synchronized to an A.C. net. The A.C. electrical power is then transported along tether lines to anchor points in the sea bed, collected in larger sea bed cables, carried ashore, and transported as high voltage A.C. power.

The only attempt known for obtaining electrical power directly from the current of a body of water is described in U.S. Pat. No. 868,798, issued Oct. 22, 1907. In this patent, a plurality of devices for generating electrical power are disclosed. Each device includes a propeller in the current or water flow stream, which turns in response thereto. Rotation of the propeller produces rotation of a shaft directly connected to an electrical generator. Electrical current from the generator is taken off through electrical conductors directly to a power transmission line on land. However, the current generated from each device would not be in phase with that generated from the other devices and accordingly, is not usable.

SUMMARY OF THE INVENTION

According to the apparatus and method of the present invention, ocean currents are utilized to generate electrical power. As distinguished from the prior art, a substantially constant fluid current velocity is utilized to mechanically drive the shaft of an electrical generator to produce a substantially constant electrical output. Rather than driving a generator directly from the current through the medium of a propeller, discrete power producing modules are provided which convert the kinetic energy of the fluid current into mechanical rotational energy, which energy is in turn cumulatively transmitted to a power absorbing module containing an electrical generator. By virtue of this arrangement, the phase relationship of the electrical current produced by the generator can be modulated so that the power output is uniform and constant and therefore usable, while the quantity of power output is only dependent on the number of power producing modules used and the size and capacity of the components of the system.

This is accomplished by having propellers disposed in the ocean or fluid current rotate the shaft of a pump which will drive fluid either contained in a closed tank or sea water surrounding the module through a second pump. The second pump acts as a turbine and its output is mechanically linked to rotate a shaft which is connected to the windings of an electrical generator. By constantly driving a single generator at a prescribed rate from a plurality of power producing pumps, large quantities of electrical power can be generated in the precise phase relation.

Each of the modules is simple in construction and is hydrodynamically shaped so as to be stable in a fluid or ocean current. Furthermore, by constructing each of the units in module form, they can individually be detached, floated to the surface, and towed to shore facilities for repair and fitting.

Further advantages of the invention will become more apparent from the following detailed description and claims and from the accompanying drawings wherein:

BRIEF DESCRIPTION OF THE DRAWINGS

FIG. 2 is an enlarged longitudinal cross-sectional view of one of the power producing modules of the apparatus illustrated in FIG. 1;

FIG. 3 is an enlarged longitudinal cross-sectional view of the power absorbing module of the apparatus illustrated in FIG. 1;

FIG. 4 is a cross-sectional view similar to FIG. 2, except illustrating a modified form of power producing module which can be used with the apparatus illustrated in FIG. 1;

FIG. 5 is a longitudinal cross-sectional view similar to FIG. 3 but illustrating a modified power absorbing or generating module which can be used with the apparatus illustrated in FIG. 1;

FIG. 6 is a longitudinal cross-sectional view of another modified form of power producing module which can be utilized with the apparatus illustrated in FIG. 1; and FIG. 7 is a longitudinal cross-sectional view of still another modified form of power producing module which can be utilized with the apparatus illustrated in FIG. 1.

DESCRIPTION OF THE PREFERRED EMBODIMENTS

Figure 1:
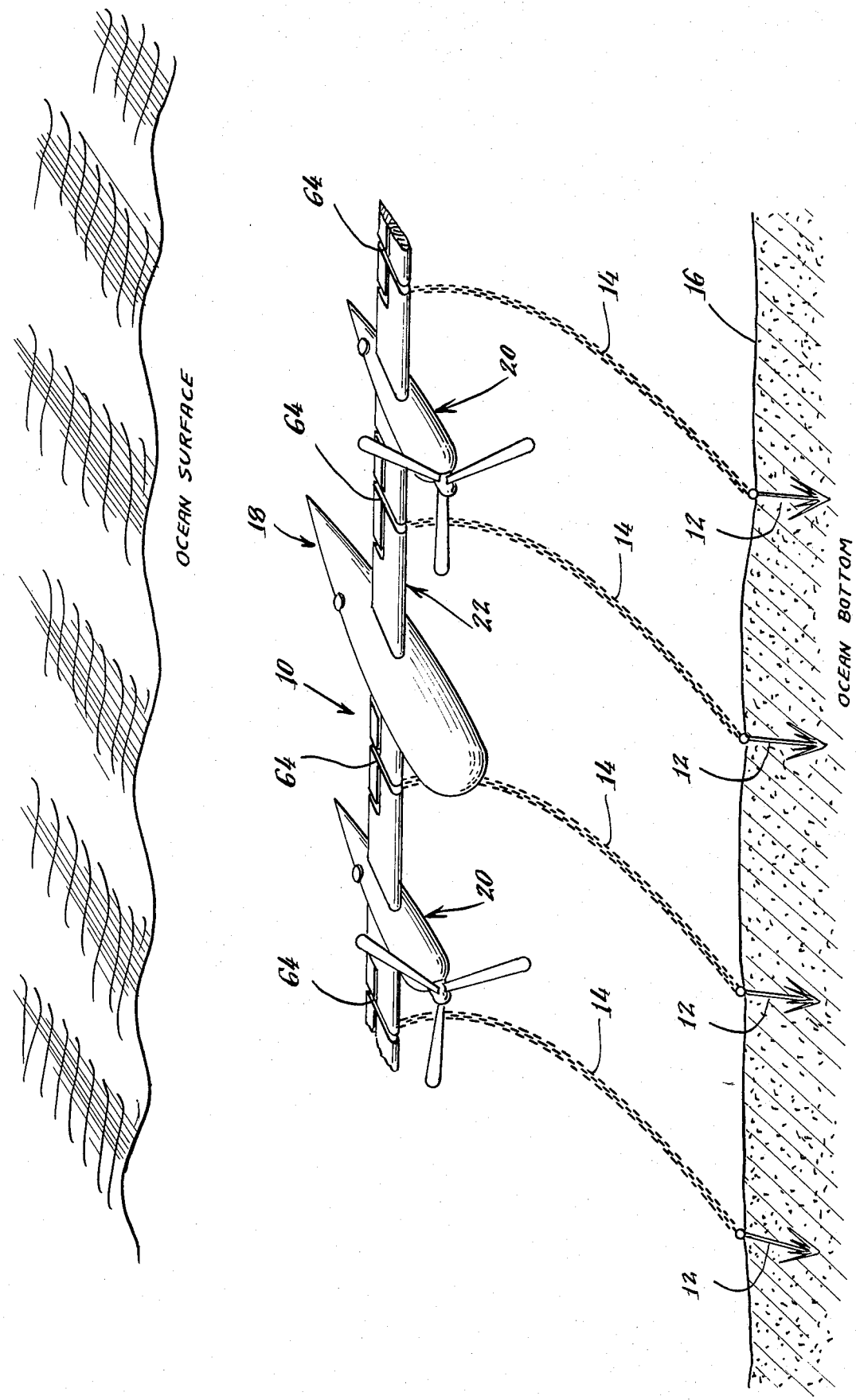
FIG. 1 is a perspective view of the apparatus comprising the subject matter of the present invention anchored in an ocean current.

Referring now to the drawings in detail, wherein like numerals indicate like elements throughout the several views, an underwater power generator constructed in accordance with the principles of the present invention is illustrated in FIG. 1 by the numeral 10. Power generator 10 is adapted to be disposed in a fluid stream of substantially constant velocity such as an ocean current and anchored by anchors 12 and chains 14 to the ocean floor 16. Power generator 10 includes a power absorbing or generating module generally indicated by the numeral 18, and a plurality of power producing modules 20 connected to the power absorbing module 18 by a hydrodynamically shaped wing structure 22.

Referring now specifically to FIG. 2, power producing module 20 includes an outer shell 24 which is hydrodynamically shaped to permit flow of water by it with a minimal amount of turbulence. A propeller 26 is rotatably mounted on the front of the shell 24 of power producing module 20. Propeller 26 is fixed to a shaft 28 which extends into the shell and is rotatably supported within a bearing 30. Shaft 28 is connected to a drive shaft 32 by a gear train 34 which increases the speed of rotation of shaft 32. Shaft 32 is fixed to a conventional centrifugal pump 36 having a pair of inlet conduits 38 and 40 and an outlet conduit 42 in communication therewith. A source of fluid contained within a tank or low pressure manifold 44 is adapted to be pumped by centrifugal pump 36 through a conduit 46 to the outlet conduit of the pump 42 which in turn feeds a high pressure manifold or tank 48. Tank or manifold 48 extends out of the power producing module 20 through wing 22 into the power absorbing or generating module 18, depicted in more detail in FIG. 3.

Pump 36 drives the fluid through the high pressure manifold or tank 48 into a conduit 50 within module 18. Conduit 50 is connected to the inlet of a second centrifugal pump (or turbine) 52, which has a pair of outlet ports feeding conduits 54 and 56 which merge into a conduit 58, leading back to low pressure manifold 44, which also extends between power absorbing module 18 and power producing module 20 through wing structure 22. As shown more clearly in FIG. 3, power absorbing module 18 is also hydrodynamically shaped.

Centrifugal pump or turbine 52 within power absorbing module 18 has an output shaft 60 which is rotated by centrifugal pump or turbine 52 as fluid cascades or is forced through the pump from the high pressure manifold 48 by centrifugal pump 36. Shaft 60 is connected to the armature of an electrical generator 62 whereby rotation of shaft 60 is converted into electrical power by the generator 62. Electrical current produced by generator 62 can be taken directly to land by electrical cable or the power can be used to electrolyze sea water to make hydrogen which can be liquified and easily transported to a place of consumption. The fluid within the conduits and pumps of the closed cycle system described in conjunction with modules 18 and 20 in FIGS. 2 and 3 respectively, can be sea water or any other readily available fluid.

In operation, an ocean current of predictible velocity will flow past producing module 20 and rotate propeller 26. This in turn will cause rotation of shaft 28 and through the medium of shaft 32 cause rotation of pump 36 to force fluid from tank 44 through tank 48 to rotate centrifugal pump or turbine 52. The output from turbine 52, through the medium of shaft 60 is used to generate electrical power in generator 62.

Any number of power producing modules can be used to feed fluid to high pressure tank or manifold 48 in power absorbing module 18 to cause increased rotation of shaft 60 and thereby generate a greater quantity of electricity by increasing the output of generator 62. This is diagrammatically shown in FIG. 1 where two modules 20 are used to force fluid through high pressure tank 48 to rotate shaft 60. Further, only one generator is used to produce electrical power, rather than separate generators feeding a single electrical line as in the prior art. This ensures that the electricity produced by generator 62 is of the same frequency and cycle, which is only possible through the use of a single generator. The quantity of electricity produced is varied by use of a different number of power producing modules through the medium of the pumps for causing rotation of generator shaft 60. The pumps in each power producing module 20 act as a mechanical linkage for driving shaft 60 from a plurality of sources so as to obtain increased power production. Also, should it be necessary to repair any one module, any power producing module 20 can be detached, floated to the surface, and towed to shore facilities, without substantially impairing the remaining power generating system.

The wing-shaped support 22 for the modules permits balance to be achieved between the buoyant and lift forces on the modules which results in minimum anchoring requirements. Similarly, wing portions can be fixed to each of the shells of the power absorbing and power producing modules and an elastomeric joint such as shown at 63 formed therebetween to enable the structure to flex under action of the flowing current. The high pressure and low pressure tanks or manifolds 48 and 44 are adapted to be disposed in the wing 22 and through the elastomeric joints. A suitable bearing and joint is disclosed in an article by S. P. Vitt, entitled ELASTOMERIC BEARINGS FOR HIGH-LOAD APPLICATIONS, appearing in ASME Journal.

In lieu of the closed system illustrated in FIGS. 2 and 3, a power producing module 20' as illustrated in FIG. 4 and a power absorbing module 18' as illustrated in FIG. 5 could be utilized to achieve the same results. In this embodiment low pressure manifold or tank 44 is eliminated and a conduit 64 is provided in power producing module 20' through conduit 64 and is filtered by a filter 66 and sucked through a conduit 24' (due to rotation of centrifugal pump 36') to centrifugal pump 36', conduit 42', high pressure manifold 48', disposed between power producing module 20' and power absorbing module 18', into conduit 50' through high pressure turbine or centrifugal pump 52', conduit 58' and back through a conduit 68 which discharges directly into the ocean current or stream. Suitable unidirectional valves can be disposed in conduits 66 and 68 to preclude entry and discharge of sea water when the modules are inoperative.

As in FIGS. 2 and 3, the open cycle illustrated in FIGS. 4 and 5 operates in substantially the same manner. Propeller 26' through the medium of shafts 28', gears 34' and shaft 32' drives the centrifugal pump 36', cascading sea water through turbine 52' which causes rotation of shaft 60' for operation of generator 62'.

If desired, counterrotating propellers may be used on each power producing module in both the open and closed cycles heretofore described to counteract any torque which may be induced in the support structure. Accordingly, FIG. 6 illustrates a closed cycle power producing module, generally designated by the numeral 20a in which counterrotating propellers 26a and 26b cause rotation of centrifugal pumps 36a and 36b respectively through the medium of shaft 32a and 32b respectively. As in FIG. 2, fluid is pumped by each of the pumps 36a and 36b from a low pressure manifold 44a to a high pressure manifold or tank 48a into a power absorbing module such as 18.

A power producing module 20b may be used in the open cycle system with counterrotating propellers 26c and 26d, as shown in FIG. 7. Each propeller drives a centrifugal pump 36c and 36d, respectively, to suck sea water through conduits 64c and 64d, respectively, from the ocean current. Pumps 36c and 36d pass the sea water through high pressure conduits 42c and 42d, respectively, to the high pressure manifold or tank 48b. The power absorbing module shown in FIG. 5 received the sea water from tank 48b and discharges it back to the sea through discharge conduit 68. In passing through conduit 68 pump 52' is operated to rotate shaft 60' to cause electrical generator 62' to produce electrical power as before.

What is claimed is:

1. Apparatus for converting the energy of water currents into useful power comprising:
   at least two power producing members adapted to be submerged within a water current of substantially constant velocity,
   a power absorbing and converting member, and
   means connecting said power producing members to said power absorbing and converting member,
   said power producing members including
   rotor means having blades positioned substantially normal to the direction of said water current and adapted to rotate under the axial influence of said water current,
   a source of liquid,
   first centrifugal pump means upstream from and communicating with said source of liquid,
   power transmission means between said rotor means and centrifugal pump means for operating said centrifugal pump means to pump liquid from said source through said connecting means to said power absorbing and converting member when said rotor means rotates under the influence of said water current,
   said power absorbing and converting member including means for converting mechanical energy to useable power and,
   second centrifugal pump means communicating with said connection means and operable in response to receiving liquid from said first centrifugal means through said connection means for supplying mechanical energy to said energy converting means and for returning said liquid to its source.

2. Apparatus in accordance with claim 1 wherein said liquid source is a tank of liquid housed within one of said members.

3. Apparatus in accordance with claim 1 wherein said liquid source is the water surrounding said power producing members.

4. Apparatus in accordance with claim 3 wherein the downstream side of said first pump means and the upstream side of said second pump means includes conduit means communicating with said source of water.

5. Apparatus in accordance with claim 1 wherein said power producing members include counter-rotating rotor means.

6. Apparatus in accordance with claim 1 wherein said connecting means includes a flexible coupling between said power absorbing and converting member and said power producing members.

7. Apparatus in accordance with claim 1 wherein said power absorbing and converting member and said power producing members are hydrodynamically shaped bodies.

8. Apparatus in accordance with claim 7 wherein said connecting means includes a hydrodynamically shaped wing between said power absorbing and converting member and said power producing members.

9. Apparatus in accordance with claim 1 including means for anchoring said power absorbing and power producing members.

10. A method for producing electrical power comprising the steps of:
   disposing more than one rotatable member in a liquid stream of substantially constant velocity,
   each of said rotatable members having blades positioned substantially normal to the flow of said liquid stream,
   causing the liquid stream to mechanically rotate said members, and
   converting the mechanical rotation of said members into energy for operating a single electrical generator wherein the output of said members is mechanically coupled to the generator by causing the output of said members to centrifugally pump a liquid source to drive a turbine coupled to said generator.

* * * * *